US008508807B2

(12) United States Patent
Tanaka et al.

(10) Patent No.: US 8,508,807 B2
(45) Date of Patent: Aug. 13, 2013

(54) IMAGE READING APPARATUS, BLACK CORRECTION EXECUTING METHOD, AND A COMPUTER-READABLE MEDIUM STORING BLACK CORRECTION EXECUTING PROGRAM

(75) Inventors: Akihiko Tanaka, Kanagawa (JP); Kazuaki Shintani, Kanagawa (JP); Shinichi Gono, Kanagawa (JP); Yosuke Takebe, Kanagawa (JP); Mitsugu Kamio, Kanagawa (JP); Mayumi Tada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 897 days.

(21) Appl. No.: 12/568,219

(22) Filed: Sep. 28, 2009

(65) Prior Publication Data

US 2010/0182652 A1 Jul. 22, 2010

(30) Foreign Application Priority Data

Jan. 20, 2009 (JP) .................................. 2009-009940

(51) Int. Cl.
*H04N 1/04* (2006.01)
*H04N 1/40* (2006.01)

(52) U.S. Cl.
USPC .......... 358/461; 358/446; 358/474; 358/496; 358/497; 358/486; 358/408

(58) Field of Classification Search
USPC ................. 358/461, 445, 446, 529, 496, 497, 358/474, 486, 40; 382/274
See application file for complete search history.

(56) References Cited

U.S. PATENT DOCUMENTS

| 4,862,286 | A * | 8/1989 | Suda et al. ..................... 358/494 |
| 5,177,621 | A * | 1/1993 | Ohtaki et al. .................. 358/406 |
| 7,161,626 | B1 * | 1/2007 | Nara ............................. 348/243 |
| 7,359,099 | B2 * | 4/2008 | Soeda et al. ................... 358/505 |
| 7,542,081 | B2 * | 6/2009 | Ohashi .......................... 348/241 |
| 7,869,086 | B2 * | 1/2011 | Soeda ............................ 358/1.9 |
| 2007/0216962 | A1 | 9/2007 | Inage | |
| 2007/0223069 | A1 * | 9/2007 | Ota .............................. 358/529 |
| 2008/0266617 | A1 | 10/2008 | Suzuki | |
| 2010/0165423 | A1 * | 7/2010 | Okuzono ....................... 358/488 |
| 2011/0109945 | A1 * | 5/2011 | Tsukahara .................... 358/461 |

FOREIGN PATENT DOCUMENTS

| JP | 2-177669 A | 7/1990 |
| JP | 6-350925 A | 12/1994 |
| JP | 2007-251797 A | 9/2007 |
| JP | 2008278277 A | 11/2008 |

OTHER PUBLICATIONS

Japanese Patent Office Action dated Oct. 24, 2012 for corresponding application JP 2009-009940 and English-language translation thereof.

* cited by examiner

*Primary Examiner* — Cheukfan Lee
(74) *Attorney, Agent, or Firm* — Sughrue Mion, PLLC (57) ABSTRACT

The present invention provides an image reading apparatus that includes: a photoelectric sensor including plural reading pixels aligned in one direction and output an electric signal depending on the amount of light from an image on the document; a read control section that reads a document image with the photoelectric sensor in accordance with a read instruction, and obtains image data; a black correction section that performs a black correction to adjust an output under dark condition of each reading pixel to a value within a predetermined range, the output under dark condition being an electric signal output when the amount of light input is zero; and a black correction execution determining section that determines whether to perform the black correction, when the read interval between each two document sheets of the multi-page document is equal to or shorter than a predetermined period of time.

16 Claims, 9 Drawing Sheets

IMAGE READING APPARATUS, BLACK CORRECTION EXECUTING METHOD, AND A COMPUTER-READABLE MEDIUM STORING BLACK CORRECTION EXECUTING PROGRAM

CROSS-REFERENCE TO RELATED APPLICATION

This application is based on and claims priority under 35 USC 119 from Japanese Patent Application No. 2009-009940 filed Jan. 20, 2009.

BACKGROUND

1. Technical Field

The present invention relates to an image reading apparatus, a black correction executing method, and a computer-readable medium storing a black correction executing program.

2. Related Art

During scanning, two or more pixels accumulate an electric charge according to a quantity of light input, and an electrical signal is output according to the accumulated charge. In order to improve quality, shading compensation for a photoelectric sensor may be provided based on the accumulated charge in order to improve image quality. Additionally, white and black correction may be carried out in order to acquire offset data to be used as a standard for the image data. However, such correction tends to increase the document reading cycle, particularly for successive documents. In image reading apparatuses, shortening document reading cycles and increasing productivity are required.

SUMMARY

According to an aspect of the present invention, there is provided an image reading apparatus that includes: a photoelectric sensor that includes a plurality of reading pixels aligned in one direction with respect to a document that each output an electrical signal depending on an amount of light from an image on the document; a read control section that reads a document image by using the photoelectric sensors in accordance with a read instruction, and obtains image data; a black correction section that performs a black correction to adjust an output of each of the reading pixels of the photoelectric sensor to a value falling within a predetermined range, the output being an electrical signal output obtained when an amount of light input to the corresponding reading pixel is zero; and a black correction execution determining section that determines whether the black correction section is to perform the black correction, when a read interval between each two document sheets of the multi-page document is equal to or less than a predetermined period of time.

BRIEF DESCRIPTION OF THE DRAWINGS

Exemplary embodiments of the present invention will be described in detail based on the following figures, wherein.

DETAILED DESCRIPTION

Herebelow, an example of exemplary embodiments of the present invention will be described in detail with reference to the drawings.

First Exemplary Embodiment

Brief Description of Image Reading Apparatus

Figure 1:
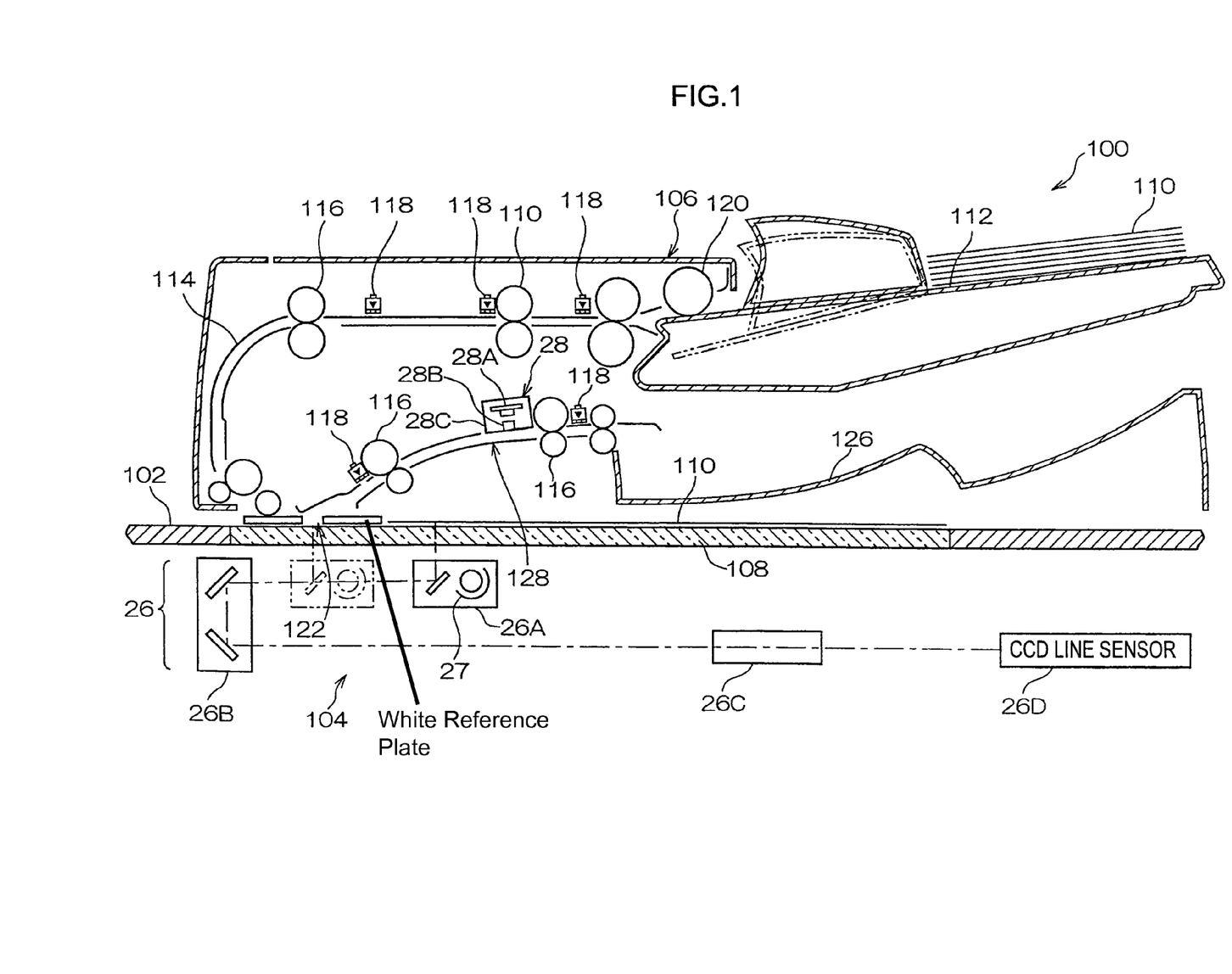
FIG. 1 is a schematic view of an image reading apparatus in accordance with a first exemplary embodiment.

FIG. 1 illustrates an image reading apparatus 100.

The image reading apparatus 100 includes a rectangular main body 104 covered with a housing 102. Further, the image reading apparatus 100 includes a feeder section 106 placed above the main body 104.

The upper portion of the main body 104 is opened. A platen 108 formed with a transparent glass plate is attached to the opening portion.

A line sensor module 26 for the image reading apparatus main body is provided below the platen 108 (or inside the main body 104).

The line sensor module 26 for the image reading apparatus main body includes a light source 27, a first section 26A, a second section 26B, an optical system 26C, and a CCD line sensor 26D. The light source 27 emits light onto a document 110 placed on the platen 108. The first section 26A has a mirror that reflects, at approximately 90 degrees, the light reflected from the document 110. The second section 26B has a pair of mirrors that reflect, at approximately 180 degrees in two stages, the light received from the mirror of the first section 26A. The optical system 26C collects the light from the second section 26B. The CCD line sensor 26D is placed in the imaging position in the optical system 26C.

To read an image from the document 110 placed on the platen 108, the image reading apparatus 100 moves the second section 26B by half the movement distance of the first section 26A, while keeping the first section 26A and the second section 26B in synchronization with each other. Due thereto, the image reading apparatus 100 maintains uniform optical path lengths, and provides an image to the CCD line sensor 26D.

As shown in FIG. 1, a document loading section 112 on which the plural documents 110 may be stacked is provided in the feeder section 106.

The document loading section 112 is designed to rotate about its center portion. With this arrangement, the left end of the document loading section 112 shown in FIG. 1 moves up and down.

Starting from the uppermost sheet, the document 110 stacked on the document loading section 112 is sequentially transported along a document path formed with plural guide plates 114. At predetermined locations on the transport path, the guide plates 114 are shredded and transportation roller pairs 116 are provided thereto. Also, at predetermined locations on the transport path, document detection sensors 118 are provided. The document detection sensors 118 detect a top end or a rear end of each sheet of the document 110.

When the left end of the document loading section 112 moves upward, the uppermost sheet of the document 110 is brought into contact with a feeding roller 120. When the feeding roller 120 and the transportation roller pairs 116 are rotated by the driving force of a motor (not shown), the document 110 is transported along the transport path.

The transport path is formed along the guide plates 114 at the left end of the feeder section 106 shown in FIG. 1. The transport path approaches a right-side image reading section 122 on the main body 104, but gradually moves away from the right-side image reading section 122. The transport path further extends to a discharge portion that leads to a discharge tray section 126, provided below the document loading section 110 shown in FIG. 1.

When the CCD line sensor 26D reads an image from the right-side of a sheet of the document 110 with by the feeder section 106, the first section 26A is positioned in the position of the right-side image reading section 122.

The first section 26A is positioned not only in the position of the right-side image reading section 122, but also in a stand-by position (home position) and a white balance adjustment position.

On the transport path, a reverse-side image reading section 128 is also provided between the right-side image reading section 122 and the discharge portion leading to the discharge tray section 126. A feeder-section line sensor module 28 is provided above the reverse-side image reading section 128 on the transport path shown in FIG. 1.

The feeder-section line sensor module 28 includes a CIS (Contact Image Sensor) 28A and a SLA (Selfoc Lens Array) 28B that are housed in a housing 28C. The CIS 28A has sensor chips that are formed with plural photoelectric transducers and are arranged in a direction perpendicular to the transporting direction of the document 110. The SLA 28B is placed at a location that faces the detection face (the image reading face) of the CIS 28A. The CIS 28A reads an image from the reverse-side of each sheet of the document 110 (the upper surface of each sheet on the transport path in the reverse-side image reading section 128).

(Hardware Configuration of Read Control System)

Figure 2:
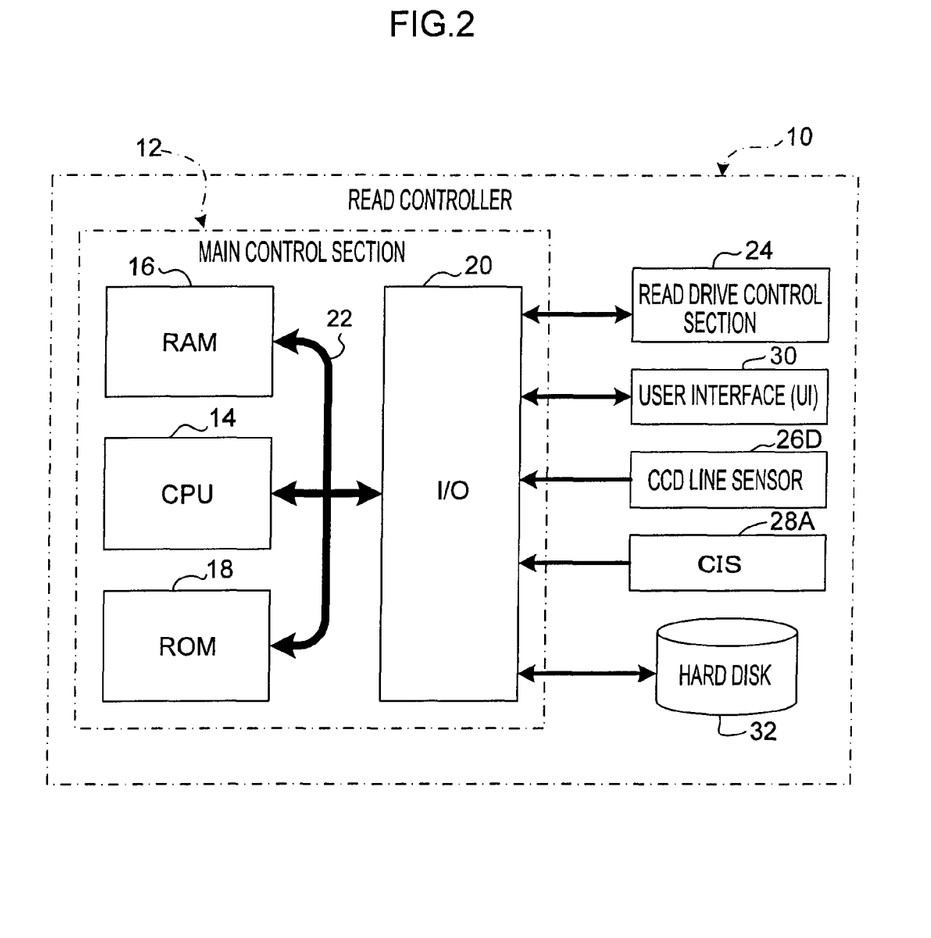
FIG. 2 is a schematic view of a read controller which is the control device in the image reading apparatus, according to the first exemplary embodiment.

FIG. 2 is a schematic view of a read controller 10 that serves as the control device in the image reading apparatus 100 according to the first exemplary embodiment.

The read controller 10 includes a main control section 12 that collectively manages and controls operations relating to image reading.

The main control section 12 includes a CPU 14, a RAM 16, a ROM 18, an I/O (input/output) section 20, and a bus 22 such as a data bus or a control bus that connects those components to one another.

A read drive control section 24 is connected to the I/O section 20. The read drive control section 24 controls the drive system of the feeder section 106 (see FIG. 1), when the document 110 being transported is read. The read drive control section 24 also controls the drive system of an optical moving section or the like, for reading an image from the document 110 placed and steadied on the platen 108.

The CPU 14 reads various read controlling programs from the ROM 18, and performs after described operations. Those programs may be stored and provided through a portable storage medium such as a CD-ROM.

The CCD line sensor 26D and the CIS 28A attached to the feeder section 106 are connected to the I/O section 20.

Note that, images are formed on both sides of each sheet of the document 110. When both sides of each sheet of the document 110 are to be read, the read controller 10 controls the right-side image reading section 122 of the feeder section 106 to move the first section 26A. In this position, the document 110 is transported in one direction of the transport path. Accordingly, the image on one face (lower surface/right-side surface) is read by the CCD line sensor 26, and the image on the other face (upper surface/reverse-side surface) is read by the CIS 28A.

An UI (User Interface) 30 is also connected to the I/O section 20. The UI 30 receives instructions input from users, and notifies the users of the information related to image processing.

A hard disk 32 is also connected to the I/O section 20. The hard disk 32, for example, stores read data.

Here, the first exemplary embodiment is configured to simplify the black correction and white correction performed on the CCD line sensor 26D in each reading operation.

A white correction is an operation performed to correct a temporal fluctuation of the light amount in a signal which is output from the CCD line sensor 26D. A white correction is performed by lighting the light source 27 in the position of the right-side image reading section 122 and reading a white reference plate provided beforehand at a predetermined end portion. Further, the output value obtained by reading the white reference plate is then adjusted to a reference white level average value that is achieved beforehand at the time of shading.

A black correction is an operation performed to adjust the value of output values of the pixels or among the pixels to a predetermined target level, when light is not input onto the reading face (the pixels) of the CCD line sensor 26D.

When the sheets of the document 110 are successively read in a high-speed image reading operation, the reading intervals (the transportation time between each one sheet of the document 110 and the next sheet of the document 110) are shortened, so that the document reading cycle time is shortened.

However, when the white correction and the black correction are performed during the reading intervals, each of the reading intervals needs to be longer than the total time required for the white correction and the black correction.

More specifically, the following periods are required for the white correction time and the black correction time.

White correction time: period of time required for awaiting ON stabilization of the light source 27+white correction data acquirement+correction time.

Black correction time: period of time required for awaiting OFF stabilization of the light source 27+black correction data acquirement+correction time.

Figure 3:
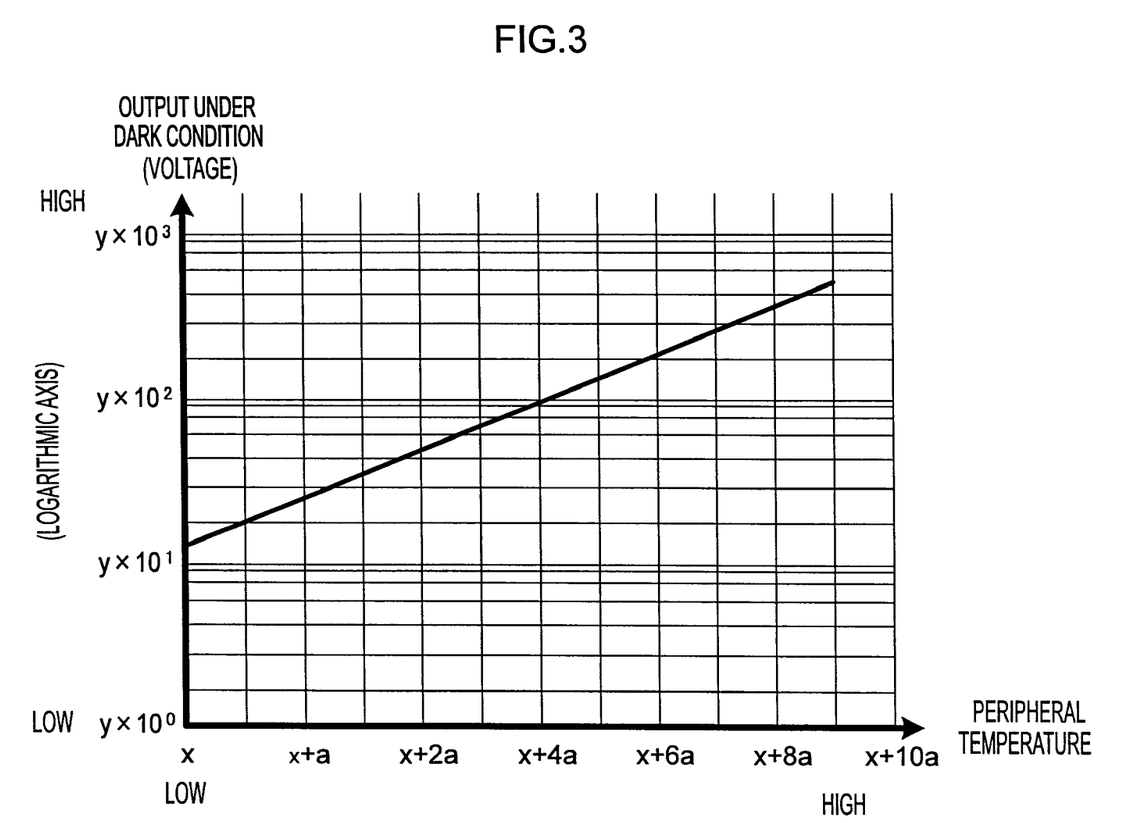
FIG. 3 shows the peripheral temperature/output fluctuation characteristics of a CCD line sensor.

Particularly, the black correction is to correct the fluctuation of the temperature/output under dark condition characteristics of the CCD line sensor 26D (see FIG. 3). Accordingly, if line clamping is performed by an analog processing circuit, corrections may be performed on the CCD line sensor 26D. However, the fluctuation of the output under dark condition of each device in one line sensor cannot be corrected by performing line clamps.

In FIG. 3, the abscissa axis (x-axis) indicates the peripheral temperature of the CCD line sensor 26D, and the ordinate axis (y-axis) indicates the output under dark condition of the CCD line sensor 26D. As can be seen from FIG. 3, the output under dark condition increases logarithmically with a rise in the peripheral temperature. The output under dark condition of the CCD line sensor 26D is sensitive to temperature fluctuations. Therefore, in a high-quality reading mode, the black correction cannot be skipped. However, if the black correction is performed on each sheet of the document, the productivity becomes lower in a mode in which each read interval is shorter than the total time of the white correction time and the black correction time.

When the temperature is low and does not vary greatly, the fluctuation of the output under dark condition is small. Accordingly, when the fluctuation of the output under dark condition is small, there is no need to perform the black correction to each sheet of the document.

In the first exemplary embodiment, a check is made to determine whether each reading interval is longer than the total time of the white correction time and the black correction time, depending on whether the reading mode and the image quality setting of the document are set to a high-quality mode or a high-speed mode. If each reading interval is determined to be long enough to perform the black correction, the black correction is performed in the first exemplary embodiment.

If each reading interval is determined not to be long enough to perform the black correction, and if high quality is not required and adverse influence on the image quality of the output under dark condition is not predicted, the black correction is skipped in the first exemplary embodiment. In this manner, the successive reading time required to read the document 110 is shortened in the first exemplary embodiment. In a second exemplary embodiment, on the other hand, the fluctuation of voltage of the output under dark condition, due to a temperature fluctuation in the CCD line sensor 26D, is measured to determine whether to perform the black correction. In this manner, only the minimum necessary black correction is performed during the read intervals in the second exemplary embodiment (described later in detail).

Figure 4:
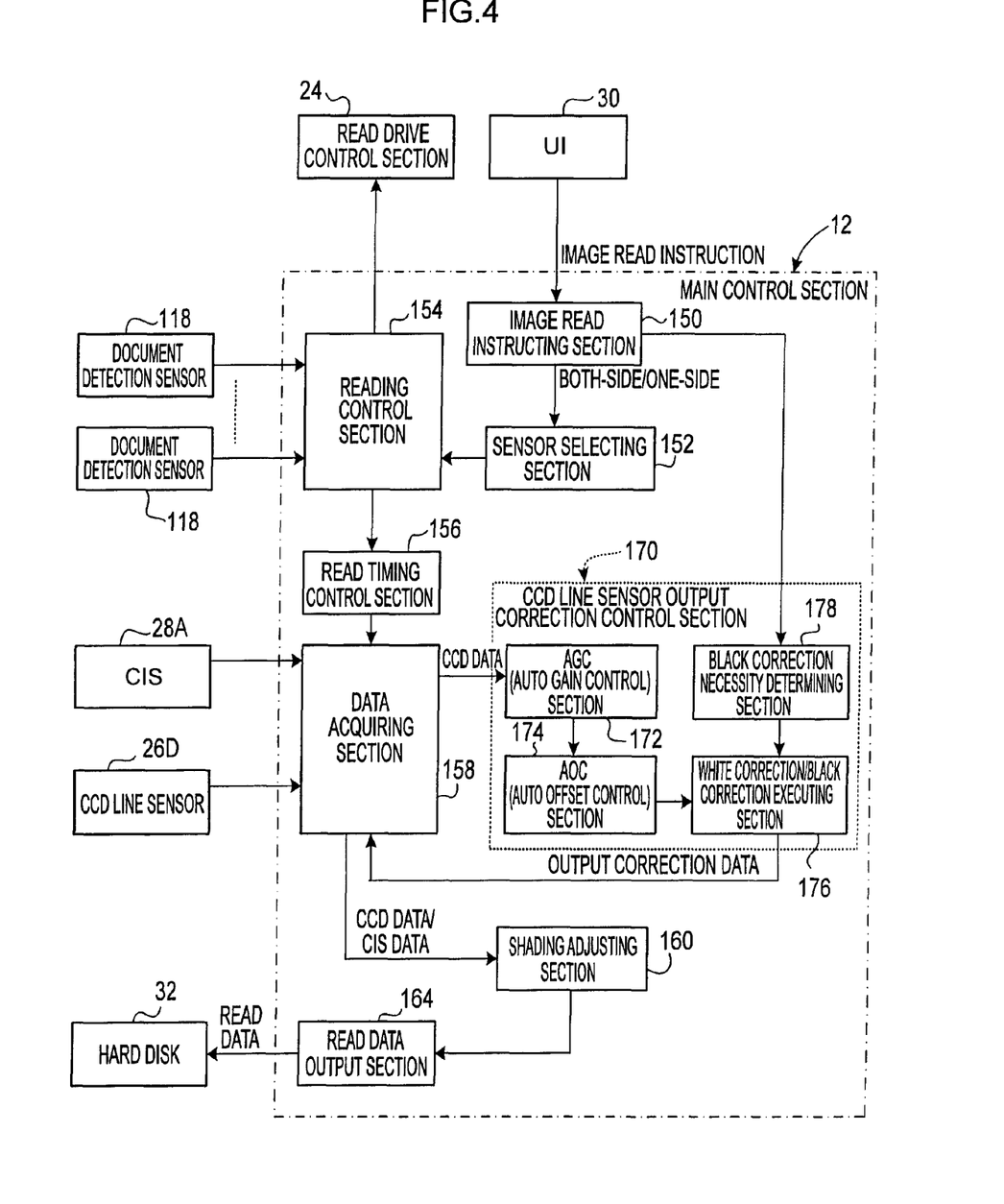
FIG. 4 is a functional block diagram illustrating the control operations related to the image reading and black corrections in the main control section, according to the first exemplary embodiment.

FIG. 4 is a functional block diagram illustrating the control operation related to the image reading and determining the necessity for the black correction in the main control section 12 (see FIG. 2), according to the first exemplary embodiment. Those blocks in FIG. 4 indicate functions, and do not represent a hardware configuration.

The UI 30 is connected to an image read instructing section 150. The UI 30 outputs an image read instructing signal to the image read instructing section 150.

The image read instructing section 150 analyzes the image read instructing signal, and detects the reading mode (a both-side reading mode or a one-side reading mode) for the document 110. The image read instructing section 150 is connected to a sensor selecting section 152, and outputs the detected reading mode. Based on the reading mode, the sensor selecting section 152 selects the sensor to be used.

In the first exemplary embodiment, when one side of each sheet of the document 110 is read, either the feeder section 106 or the platen 108 may be selectively used, depending on the position in which a user places the document 110. When both sides of each sheet of the document 110 are read, the document 110 is placed on the feeder section 106.

Accordingly, there are the following image reading patterns:
(Pattern 1) One-side reading, with the document sheets being placed on the platen 108;
(Pattern 2) One-side reading, with the document sheets being stacked on the document loading section 112 of the feeder section 106; and
(Pattern 3) Both-side reading, with the document sheets being stacked on the document loading section 112 of the feeder section 106.

In the pattern 1, the sensor to be used is the CCD line sensor 26D. When the document 110 is placed on the platen 108 and a reading instruction is issued, the read drive control section 24 moves the second section 26B by half the movement distance of the first section 26A, while the first section 26A and the second section 26B keep each other in synchronization. Due there to (sub-scanning), uniform optical path lengths are maintained, and the image on the right-side of the document 110 is provided to the CCD line sensor 26D.

In the pattern 2, the sensor to be used is the CCD line sensor 26D. When the document 110 is placed on the document loading section 112 of the feeder section 106 and a read instruction is issued, the first section 26A is positioned in the right-side image reading section 122. The document 110 moves along the transport path, and passes through the right-side image reading section 122 (sub-scanning). In this manner, the image on the right-side of each sheet of the document 110 is provided to the CCD line sensor 26D.

In the pattern 3, the sensors to be used are the CCD line sensor 26D and the CIS 28A. When the document 110 is placed on the document loading section 112 of the feeder section 106 and a read instruction is issued, the first section 26A is positioned in the position of the right-side image reading section 122. The document 110 then moves along the transport path, and passes through the right-side image reading section 122 (sub-scanning). In this manner, the image on the right-side of each sheet of the document 110 is provided to the CCD line sensor 26D (right-side reading). Here, the right side of each sheet of the document 110 faces downward on the transport path. The document 110 further moves along the transport path, and passes through the reverse-side image reading section 128 (sub-scanning). In this manner, the image on the reverse-side of each sheet of the document 110 is provided to the CIS 28A (reverse-side reading). Here, the reverse side of each sheet of the document 110 faces upward on the transport path.

As shown in FIG. 4, the sensor selecting section 152 is connected to a reading control section 154. The sensor selecting section 152 transmits image read pattern information to the reading control section 154. The image read pattern information is formed based on whether the reading mode is the one-side reading mode or the both-side reading mode, and on whether the document 110 is placed on the platen 108 or the document loading section 112 of the feeder section 106.

The reading control section 154 is connected to the read drive control section 24. The reading control section 154 instructs the read drive control section 24 to control the switching ON and OFF of the light source 27, control the transportation of the document 110, and control the movement of the first section 26A and the second section 26B. The document detection sensors 118 are also attached to the reading control section 154. The document detection sensors 118 detect the transportation state (the transportation position) of the document 110 in the feeder section 106.

Further, the reading control section 154 is connected to a read timing control section 156.

The read timing control section 156 is connected to a data acquiring section 158. The CCD line sensor 26D and the CIS 28A are connected to the data acquiring section 158.

In accordance with an instruction from the reading control section 154, the read timing control section 156 transmits a read start signal and a read end signal for the CCD line sensor 26D and the CIS 28A to the data acquiring section 158.

The data acquiring section 158 acquires read data from a selected sensor (at least one of the CCD line sensor 26D and the CIS 28A) during the period controlled by the read timing control section 156.

The data acquiring section 158 is connected to a shading adjusting section 160. The data acquiring section 158 transmits the acquired read data to the shading adjusting section 160.

The shading adjusting section 160 adjusts the acquired read data (raw data), based on the shading adjustment data of a sensor that is tested, for example, before shipment or the data obtained at a predetermined period after power activation.

Various kinds of image processing are executed to the read data adjusted by the shading adjusting section 160, and is then transmitted to the hard disk 32 or the like via a read data output section 164.

The data acquiring section 158 is connected to an AGC (Auto Gain Control) section 172 of a CCD line sensor output correction control section 170. The data acquiring section 158 transmits the data (CCD data) read from the CCD line sensor 26D to the AGC section 172.

The AGC section 172 performs gain control (amplification) on the CCD data.

Figure 5:
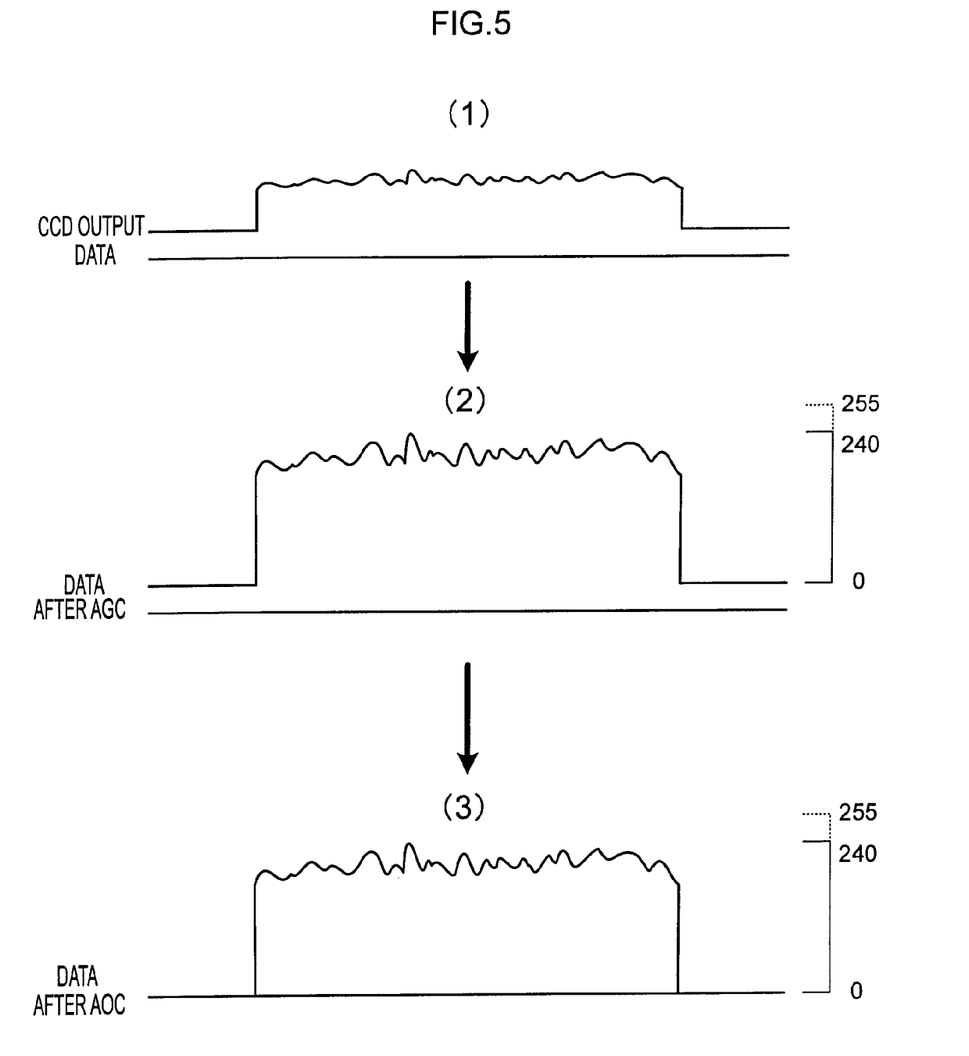
FIG. 5 is a diagram showing the converted states of CCD output data subjected to AGC and AOC.

The AGC section 172 performs gain control on the CCD data (raw data) shown in (1) of FIG. 5, to set the gradation of each pixel shown in (2) of FIG. 5 (AD conversion). In such a case, the maximum value of the gradation of 8 bits (0 to 255) at the time of white reference reading is set at approximately 240, for example, with the fluctuation of the white balance being taken into consideration.

The AGC section 172 is connected to an AOC (Auto Offset Control) section 174. The AGC section 172 transmits the data gain-controlled in the AGC section 172.

The AOC section 174 performs offset control on the gain-controlled data.

The AOC section 174 corrects the minimum value of the output data from the AGC section 172, shown in (2) of FIG. 5, to the 0 level (see (3) of FIG. 5).

In practice, in the case of the gradation of 0 to 255 (255 being defined as white), "10" is subtracted from the value obtained by adjusting the minimum value of the output data to "10", for example, so as to prevent data saturation at the 0 level.

The AOC section 174 is connected to a white correction/black correction executing section 176. The white correction/black correction executing section 176 performs the white correction and the black correction on the gain-controlled and offset-controlled CCD data that is received from the AOC section 174. Output correction data is then fed back from the CCD line sensor output correction control section 170 to the data acquiring section 158.

A black correction necessity determining section 178 is also provided in the CCD line sensor output correction control section 170. The black correction necessity determining section 178 determines whether to perform the black correction that is conventionally performed during the reading interval between every two successive sheets of the document 110. The black correction necessity determining section 178 then transmits the determination result to the white correction/black correction executing section 176, to restrict the number of times the black correction performed to the minimum necessary number.

In the first exemplary embodiment, the image read instructing section 150 is connected to the black correction necessity determining section 178. To execute an image read instruction input from the UI 30, the following information is input from the image read instructing section 150: reading mode information (information 1); read color information (information 2); document image quality setting information (information 3); binary or multi-value image setting information (information 4); data usage information (information 5); reading method (information 6); copy number information (information 7); and resolution and magnification information (information 8).

(Information 1) The reading mode information is the information that indicates whether to use the feeder section 106 or the platen 108 when an image is read. This information is determined by whether a document is placed on the feeder section 106.

(Information 2) The read color information is the information that indicates whether the light source 110 is read in multicolor or in black and white.

The document image quality and read image quality setting information (information 3), the binary or multi-value image setting information (information 4), and the data usage information (information 5) are the information indicating that the read data is to be copied, transmitted, or stored, or the information indicating that the data storage is to be performed in a high-compression manner, a standard manner, or a low-compression manner.

(Information 6) The reading method setting information is the information about a mix-size document designation, both-side reading, or one-side reading.

(Information 7) The copy number information is the information indicating how many copies are to be output for each sheet of the document 110.

(Information 8) The resolution and magnification setting information is the information about the exposure cycle and the reading speed based on the resolution and magnification of read data.

Other information includes the information about the types of the document, such as a text and photo, a text only, a photograph only, and a map, and the information about image quality adjustment, such as high-precision or high-speed.

The black correction necessity determining section 178 determines whether to perform the black correction, using a part of or all of the information 1 through 8 described above.

Figure 6A:
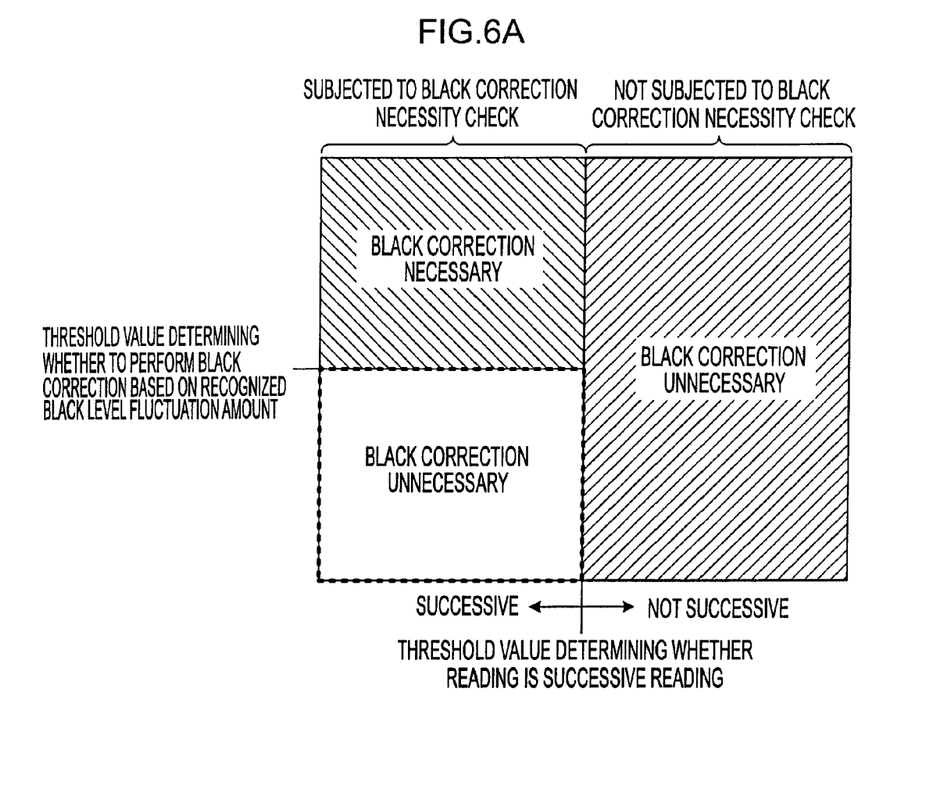
FIGS. 6A and 6B are conceptual diagram showing the narrowing process in a black correction necessity determining operation.

When a check is made to determine whether to perform the black correction, document sheets are divided into those to be subjected to determine whether the black correction is to be performed thereon, or into those not to be subjected to determine whether the black correction is to be performed thereon, based on the threshold value used to determine whether the document 110 is for successive reading, as shown in FIG. 6A. When each read interval is predicted to be longer than the total time of the white correction time and the black correction time in accordance with the various kinds of information, the black correction is performed on each document sheet. On the other hand, when each read interval is predicted to be shorter than the total time of the white correction time and the black correction time in a high-speed reading mode, the black correction is determined to be unnecessary (the targets are narrowed down in the order of (1) to (2) to (3) in FIG. 6B). Thus, note that, in FIG. 6B, the proportion of each region does not represent the corresponding narrowing-down rate.

Based on the necessity determination information from the black correction necessity determining section 178, the white correction/black correction executing section 176 performs the black correction.

Here below, referring to the flowchart shown in FIG. 7, the operations in accordance with the first exemplary embodiment are described.

Figure 7:
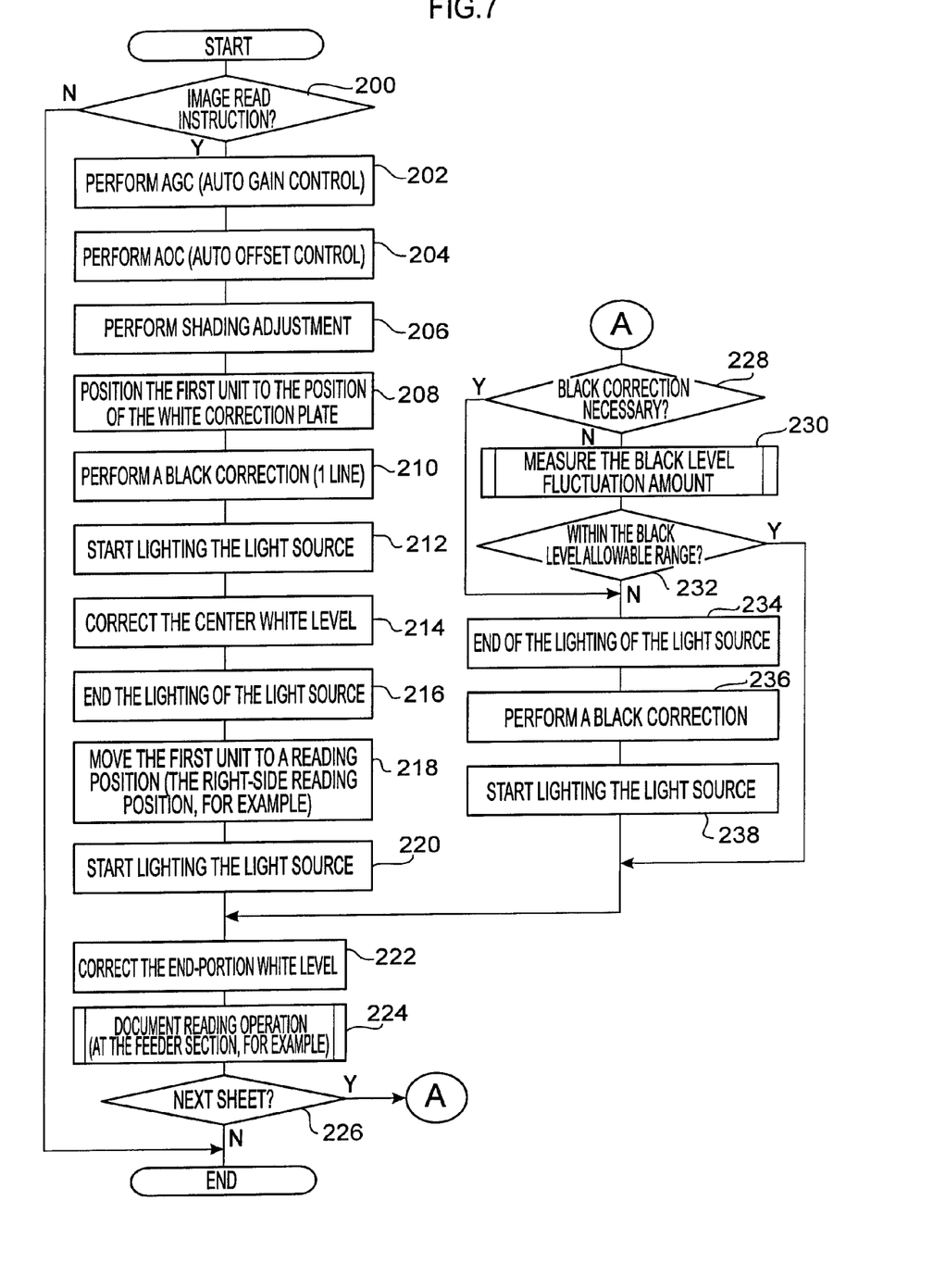
FIG. 7 is a flowchart illustrating an image read control routine, according to the first exemplary embodiment.

FIG. 7 shows the main routine of an image reading control operation.

At step 200, a check is made to determine whether an image read instruction has been issued. If the determination result is negative at step 200, this routine ends.

If the determination result is affirmative at step 200, the operation proceeds to step 202, and AGC is performed. The operation then proceeds to step 204, and AOC is performed. Further, the operation then proceeds to step 206, and shading adjustment is performed (see FIG. 5).

The procedures of steps 202, 204, and 206 may not be carried out after an image read instruction is issued, if those procedures are already carried out when the power is turned on, as described above. Namely, immediately after the power activation or after a predetermined period in a stand-by state, the positions of the reading sections are initialized, and the following steps are carried out. The AGC is performed (step 202), followed by the AOC (step 204). The shading adjustment is then performed on the CCD line sensor 26D (step 206). In the shading adjustment, the data obtained by reading the white reference plate with the CCD line sensor 26D is stored into the memory. When a document image is read, normalization is performed with the data, and a shading correction is performed. At the same time, the read data mean value at the center of the white reference plate is obtained as the white correction reference.

If the procedures of steps 202, 204, and 206 are carried out at the time of power activation, the first section 26A is first moved to the position of the white reference plate after an instruction is received at step 200.

At step 208, the first section 26A is moved from the document detecting position to a position below the white reference plate. The operation proceeds to step 210, and the black correction (1 line) is performed to read an image of the first sheet of the document 110. The operation then proceeds to step 212. At this point, the light source 27 is in a switched-OFF state. The black correction (1 line) here is performed by reading the lamp OFF data of several lines into the image memory of one line, and carrying out subtraction on each pixel when a document image is read. Alternatively, subtraction of the common offset value of the pixels may be carried out without a memory. However, subtraction is carried out on each pixel with the use of a memory, so that the unevenness in one line is corrected.

At step 212, the light source 27 is switched ON, and the operation proceeds to step 214. At step 214, a center white level correction is performed. At step 216, the light source 27 is switched OFF.

At step 218, the first section 26A is moved to a reading position (the position of the right-side reading section 122 when image reading is performed, for example, by the feeder section 106). At step 220, the light source 27 is switched on, and the operation proceeds to step 222.

At step 222, an end-portion white level correction is performed. The operation then proceeds to step 224, and document reading is started (the operation of the drive system of the feeder section 106 is started, and the document 110 is transported along the transport path).

After the document reading at step 224 is completed, the operation proceeds to step 226, and a check is made to determine whether there is the next document. If the determination result is negative at step 226, this routine ends.

If the determination result is affirmative at step 226, the operation proceeds to step 228, and a check is made to determine whether the black correction is necessary.

Figure 6B:
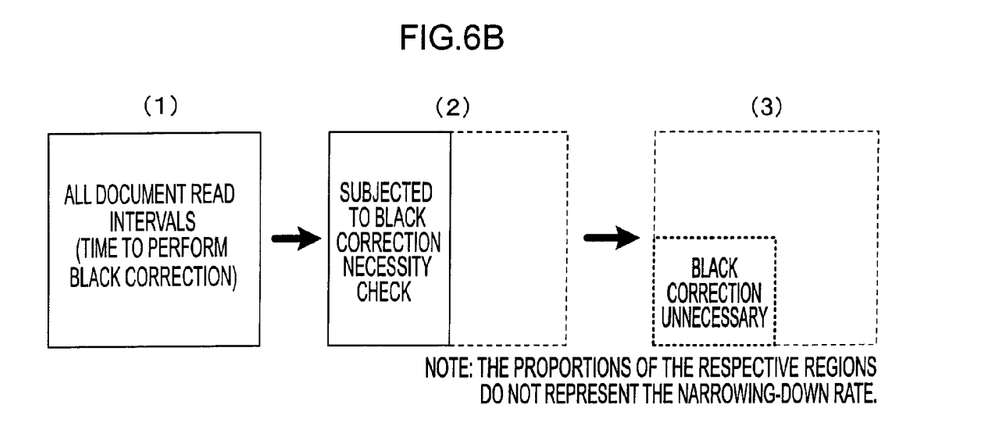

Depending on the result of the determination at step 228, narrowing is performed based on the successive reading state of the document 110 (the narrowing from the state (1) to the state (2) shown in FIG. 6B.)

When each read interval is predicted to be longer than the total time of the white correction time and the black correction time, based on the various kinds of information supplied from the UI 30, the black correction is determined to be necessary. When each read interval is shorter than the total time of the white correction time and the black correction time, in a high-speed reading operation, the black correction is determined to be unnecessary (the narrowing from the state (2) to the state (3) in FIG. 6B).

The various kinds of information includes, the reading mode information (information 1), the read color information (information 2), the document image quality setting information (information 3), the binary or multi-value image setting information (information 4), the data usage information (information 5), the reading method (information 6), the copy number information (information 7), and the resolution and magnification information (information 8). Based on a part of or all of the information, the check is made to determine whether the black correction is necessary at step 228.

The criteria for the determination based on the various kinds of information are considered to be the following predictions: (Prediction 1) Where the feeder section 106 is used, successive reading is performed, and the black correction is necessary; (Prediction 2) In a multicolor reading operation, the black correction is necessary to increase the image quality; (Prediction 3) Where the document type is "photograph", the black correction is necessary to increase the image quality; (Prediction 4) Where the reading mode is the multi-value reading mode, the black correction is necessary to increase the image quality; (Prediction 5) Where read data is copied, the black correction is necessary, since higher image quality is required than in a case where data is simply transmitted; (Prediction 6) Where there are various sizes of sheets in the document to be read, the read intervals become longer, and there is time to perform the black correction; (Prediction 7) Where the number of copies to be made from each one document sheet is large, the read intervals are long enough to eliminate the need to perform the reading at a high speed, and there is time to perform the black correction; and (Prediction 8) The reading speed and the exposure cycle are determined from the resolution and magnification setting, and a check is made to determine whether each read interval is longer or shorter than the total time of the white correction time and the black correction time.

If the determination result at step 228 is affirmative, the black correction is determined to be performed, and the operation proceeds to step 234.

If the determination result at step 228 is negative, the object is determined to be the object that should be subjected to a check to determine whether the black correction needs to be performed thereon, and the operation proceeds to step 230.

At step 230, the fluctuation of black level is detected.

At step 232 of FIG. 7, a check is made to determine whether the black level is within an allowable range. If the determination result at step 232 is positive, the black correction is determined to be unnecessary, and the operation returns to step 222.

If the determination result at step 232 is negative, the black correction is determined to be necessary, and the operation proceeds to step 234.

If the black correction is determined to be unnecessary at step 228, steps 230 and 232 may not be carried out, and the operation may return directly to step 222.

At step 234, the light source 27 is switched OFF. The operation proceeds to step 236, and the black correction is performed.

After the black correction at step 236 is completed, the operation proceeds to step 238. At step 238, the light source 27 is switched ON, and the operation returns to step 222.

Second Exemplary Embodiment

The following is a description of a second exemplary embodiment. In the following, the same components as those of the first exemplary embodiment are denoted by the same reference numerals used in the first exemplary embodiment, and explanation thereof is omitted.

In the second exemplary embodiment the black correction necessity determining section performs the determination based not on a prediction, but on a measured value of a temperature fluctuation in the CCD line sensor 26D.

Figure 8:
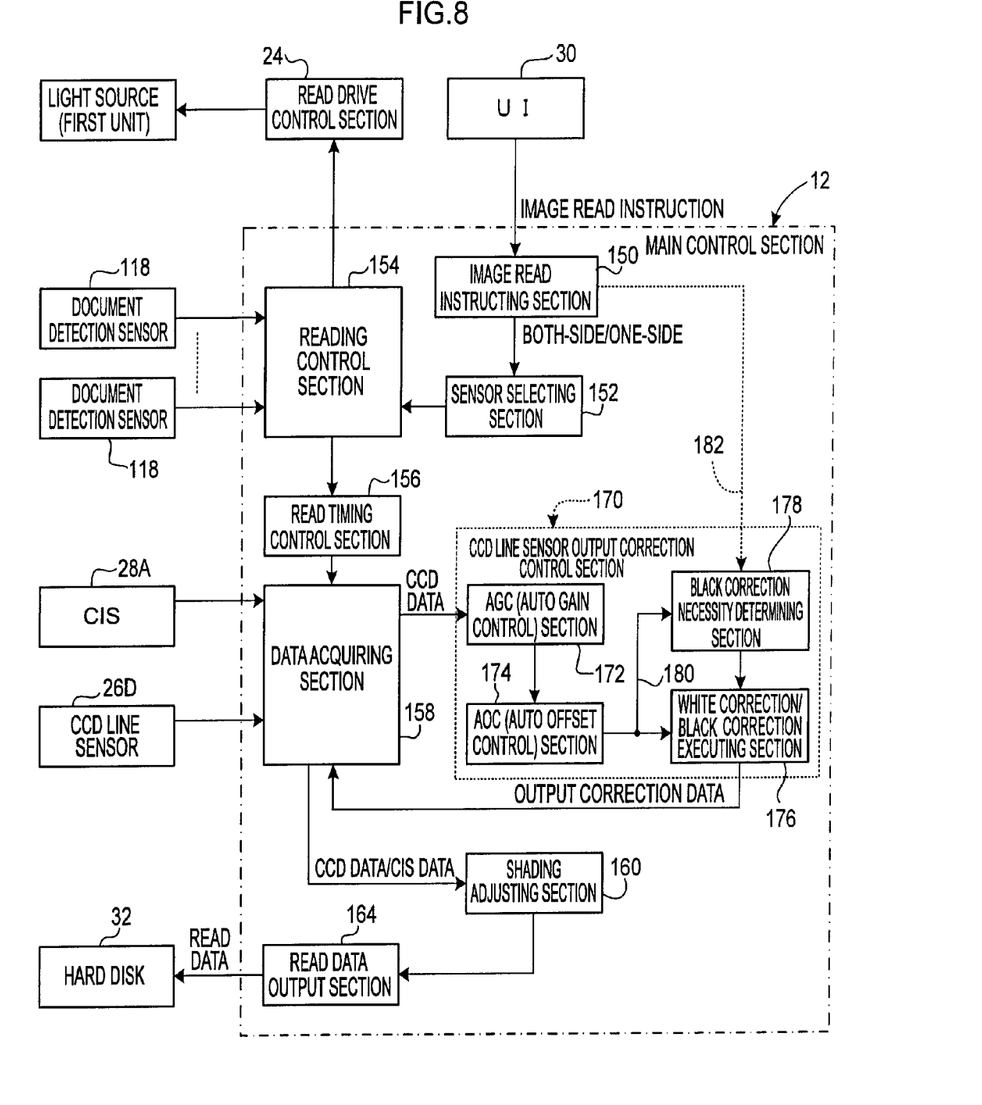
FIG. 8 is a functional block diagram illustrating the control operations related to the image reading and black corrections in the main control section, according to a second exemplary embodiment.

As shown in FIG. 8, the black correction necessity determining section 178 is connected to the AOC section 174 (see the arrow 180 in FIG. 8). CCD data is input from the AOC section 174 to the black correction necessity determining section 178.

Accordingly, the output data from the CCD line sensor 26D is input to the black correction necessity determining section 178 every time the document 110 is read.

Figure 9:
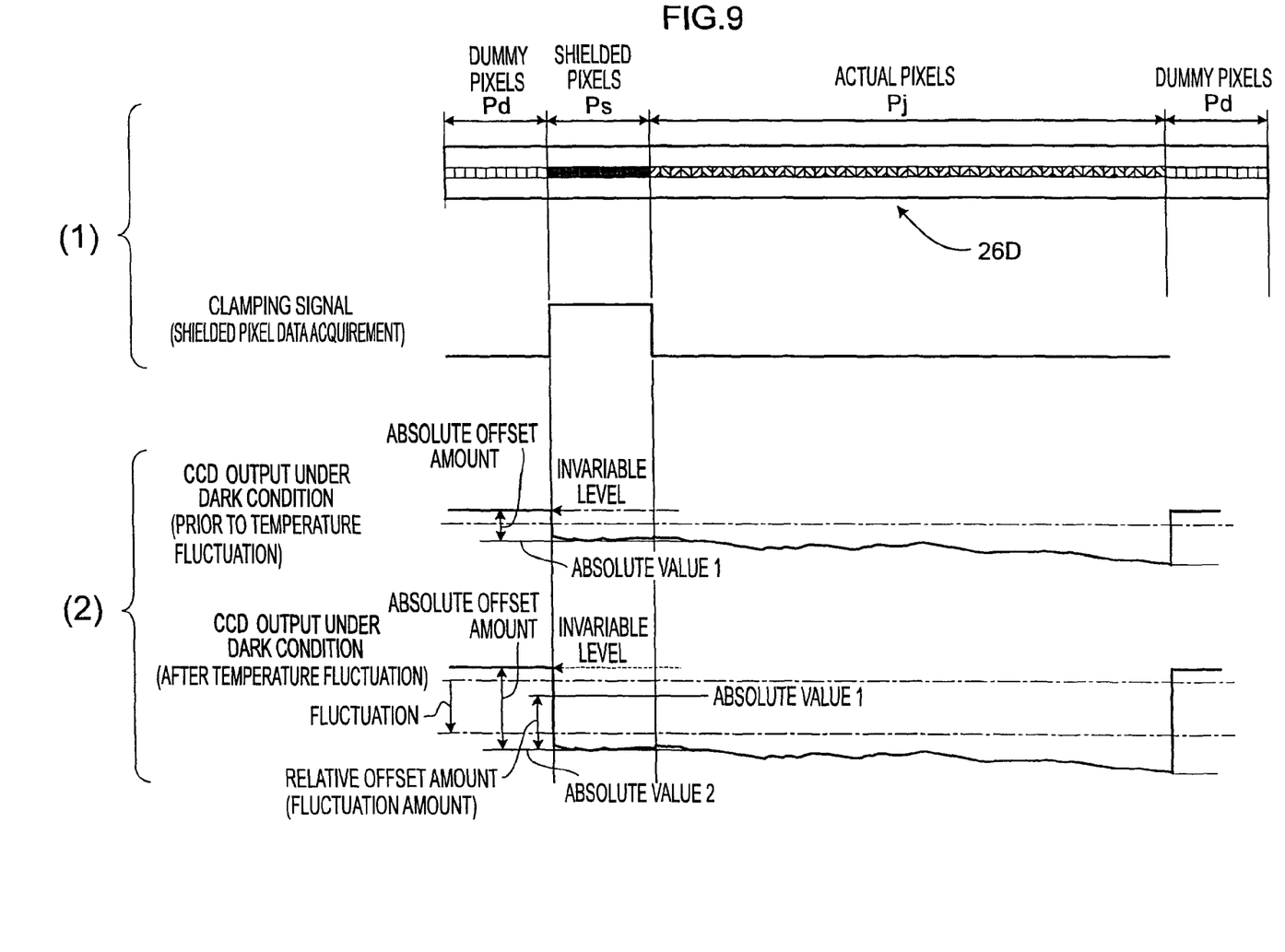
FIG. 9 is a plan view of the reading face of the CCD line sensor, and a timing chart showing the output data characteristics of the reading pixels (dummy pixels, shielded pixels, and actual pixels).

As shown in (1) of FIG. 9, the CCD line sensor 26D may be divided into a (top) dummy pixel region Pd, a shielded pixel region Ps, an actual pixel region Pj, and a (rear) dummy pixel region Pd in the main scanning direction.

The (top) dummy pixel region Pd and the (rear) dummy pixel region Pd are formed with dummy pixels and are not subsistent. In other words, output data does not fluctuate at all in the dummy pixel regions.

Light does not enter the shielded pixel region Ps, since the reading face is shielded. In the shielded pixel region Ps, the output data affected by the fluctuation of the peripheral temperature fluctuates due to the output under dark condition of the CCD line sensor 26D.

In the actual pixel region Pj, document images are actually read, and output data fluctuates with the amount of input light. The output of the CCD line sensor 26D fluctuates with temperature fluctuation, as already described with reference to FIG. 3. However, the output data affected by the fluctuation of the peripheral temperature of the CCD line sensor 26D normally corrects fluctuations. Therefore, clamping (synchronous grounding) is performed in the shielded pixel region with a clamping signal for acquiring shielded pixel data, as shown in the timing chart (2) of FIG. 9. In this manner, the influence of the output under dark condition is eliminated from the actual pixel region. However, when there is a temperature difference between chips in the CCD line sensor 26D, or when the temperature difference between both end portions is large, for example, a large difference in output under dark condition is caused between both end portions when the temperature fluctuates as shown in (2) of FIG. 9. In such a case, the difference cannot be eliminated by performing clamping in the shielded pixel region, and unevenness is observed within one line. Therefore, it is necessary to perform the black correction. In doing so, the output data (absolute data) of the shielded pixel region Ps having dummy pixels Pd as reference pixels are obtained before and after a temperature fluctuation in the CCD line sensor 26D.

Before a temperature fluctuation, the CCD line sensor 26D is maintained at normal temperature (approximately 25° C.), for example. Note that, after a temperature fluctuation is a temperature fluctuation after when the successive image reading has started.

The temperature fluctuation in the CCD line sensor 26D is measured, with the output fluctuation in the shielded pixel region Ps being the corresponding offset, and the (invariable) output of the dummy pixel regions Pd being the reference.

The shielded pixel region outputs a black level even in a lamp ON state. Accordingly, the black level fluctuation may be detected while the lamp is ON. The black level fluctuation may be detected in real time even during an image reading operation, and the lamp does not need to be switched OFF. Thus, the productivity is not adversely affected.

In the black correction necessity determining section 178, the temperature fluctuation measured in the above manner is compared with a predetermined threshold value, to determine whether to perform the black correction. The black correction may be performed based on the 1-line value. However, to correct in-plane unevenness, it is desirable that a correction is performed on each pixel by acquiring the data of each one line.

In the second exemplary embodiment, the measured value of a temperature fluctuation in the CCD line sensor 26D is checked to determine whether to perform the black correction. However, as described in the first exemplary embodiment, the black correction necessity determining section 178 may acquire various kinds of information from the image read instructing section 150, and the predictive control based on the various kinds of information may also be performed (see the dotted-line arrow 182 in FIG. 8).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
 a photoelectric sensor that includes a plurality of reading pixels aligned in one direction with respect to a document that each output an electrical signal depending on an amount of light from an image on the document;
 a read control section that reads a document image by using the photoelectric sensor in accordance with a read instruction, and obtains image data;
 a black correction section that performs a black correction to adjust an output under dark condition of each of the reading pixels of the photoelectric sensor to a value falling within a predetermined range, the output under dark condition being an electrical signal output obtained when an amount of light input to the corresponding reading pixel is zero; and
 a black correction execution determining section that determines whether the black correction section is to perform the black correction, when a read interval between each two consecutive document sheets of the document is less than a predetermined period of time.

2. The image reading apparatus of claim 1, wherein the black correction section performs the black correction on at least a first document sheet of the document after the read instruction is issued, regardless of the number of pages of the document.

3. The image reading apparatus of claim 2, wherein:
the black correction execution determining section determines whether to perform the black correction based on at least one piece of setting information including monochrome or multicolor setting information, binary or multi-value setting information, document image quality setting information, copy number setting information, data storage setting information, resolution and magnification setting information, and regular or mixed-size document designation information, the information being set with respect to the read instruction; and
the black correction section performs the black correction, when the determination result meets at least one of conditions that multicolor reading is set, multi-value reading is set, photograph document reading is set, the number of copies to be made is equal to or greater than a predetermined number, low-compression storage is set, the resolution is equal to or greater than a predetermined value, and mixed-size document reading is set.

4. The image reading apparatus of claim 1, wherein:
the black correction execution determining section determines whether to perform the black correction based on at least one piece of setting information including monochrome or multicolor setting information, binary or multi-value setting information, document image quality setting information, copy number setting information, data storage setting information, resolution and magnification setting information, and regular or mixed-size document designation information, the information being set with respect to the read instruction; and
the black correction section performs the black correction, when the determination result meets at least one of conditions that multicolor reading is set, multi-value reading is set, photograph document reading is set, the number of copies to be made is equal to or greater than a predetermined number, low-compression storage is set, the resolution is equal to or greater than a predetermined value, and mixed-size document reading is set.

5. The image reading apparatus of claim 1, wherein the black correction execution determining section determines, when the read interval between each two consecutive document sheets of the document is less than a predetermined period of time, whether the black correction section is to perform the black correction according to a condition other than the read interval between the each two consecutive document sheets of the document.

6. The image reading apparatus of claim 1, further comprising a judgment section that determines whether a read interval between each two consecutive document sheets of the document is less than a predetermined period of time,
wherein in response to the judgment section determining that the read interval is less than the predetermined period of time, the black correction execution determining section determines whether the black correction section is to perform the black correction.

7. The image reading apparatus of claim 1, wherein the black correction execution determining section determines whether the black correction section is to perform the black correction, according to an operation mode of the image reading apparatus.

8. The image reading apparatus of claim 7, wherein the operation mode is a high-speed mode or a high-quality mode.

9. The image reading apparatus of claim 1, wherein the black correction execution determining section determines to perform the black correction, when a read interval between each two consecutive document sheets of the document is longer than a correction time.

10. The image reading apparatus of claim 9, wherein the correction time includes a time to perform the black correction and a time to perform a white correction.

11. An image reading apparatus comprising:
a photoelectric sensor comprising a plurality of reading pixels aligned in one direction with respect to a document, the reading pixels of the photoelectric sensor include actual pixels that read a document image and output an electrical signal depending on an amount of light from the document image, shielded pixels having each reading face shielded so as not to be affected by external light, and dummy pixels that constantly output a fixed electrical signal;
a read control section that reads the document image by using the photoelectric sensor in accordance with a read instruction, and obtains image data;
a black correction section that performs a black correction to adjust an output under a dark condition of each of the actual pixels of the photoelectric sensor to a value falling within a predetermined range, the output under the dark condition being an electrical signal output obtained when an amount of light input to the corresponding reading pixel is zero; and
a black correction execution determining section that measures a fluctuation in an absolute difference in the actual pixels due to the photoelectric sensor and a peripheral temperature thereof, based on a difference between an output of the shielded pixels and an output of the dummy pixels, and determines whether to perform the black correction on the actual pixels, when the fluctuation is larger than a predetermined value.

12. A computer-readable medium storing a program causing a computer to execute a process to perform a black correction to correct an electrical signal in an image reading apparatus that includes, a photoelectric sensor having a plurality of reading pixels aligned in one direction with respect to a document that each output an electrical signal depending on an amount of light from an image on the document, the photoelectric sensor reading the image in accordance with a read instruction, the process comprising:
determining whether to perform the black correction, when a read interval between each two consecutive sheets of the document is less than a predetermined period of time; and
performing the black correction, in accordance with a result of the determination, to adjust an output under dark condition of each of the reading pixels of the photoelectric sensor to a value falling within a predetermined range, the output under dark condition being an electrical signal output obtained when an amount of light input to the corresponding reading pixel is zero.

13. The computer-readable medium of claim 12, the process further comprising:
performing the black correction on at least a first sheet of the document after the read instruction is issued, regardless of the number of sheets of the document.

14. The computer-readable medium of claim 13, wherein determining whether to perform the black correction comprises:
determining whether to perform the black correction based on at least one of setting information including monochrome or multicolor setting information, binary or multi-value setting information, document image quality setting information, copy number setting information, data storage setting information, resolution and magnification setting information, and regular or mixed-size document designation information, the information being set with respect to the read instruction; and performing the black correction, when the determination result meets at least one of conditions that multicolor reading is set, multi-value reading is set, photograph document reading is set, the number of copies to be made is equal to or greater than a predetermined number, low-compression storage is set, the resolution is equal to or greater than a predetermined value, and mixed-size document reading is set.

15. The computer-readable medium of claim 12, wherein determining whether to perform the black correction comprises:

determining whether to perform the black correction based on at least one of setting information including monochrome or multicolor setting information, binary or multi-value setting information, document image quality setting information, copy number setting information, data storage setting information, resolution and magnification setting information, and regular or mixed-size document designation information, the information being set with respect to the read instruction; and performing the black correction, when the determination result meets at least one of conditions that multicolor reading is set, multi-value reading is set, photograph document reading is set, the number of copies to be made is equal to or greater than a predetermined number, low-compression storage is set, the resolution is equal to or greater than a predetermined value, and mixed-size document reading is set.

16. A method for performing a black correction to correct an electrical signal in an image reading apparatus that includes a photoelectric sensor having a plurality of reading pixels aligned in one direction with respect to a document that each output the electrical signal depending on an amount of light from an image on the document, the photoelectric sensor reading the image in accordance with a read instruction, the method comprising:

determining whether to perform the black correction, when a read interval between each two consecutive sheets of the document is shorter than a predetermined period of time; and performing the black correction, in accordance with a result of the determination, to adjust an output under dark condition of each of the reading pixels of the photoelectric sensor to a value falling within a predetermined range, the output under dark condition being an electrical signal output obtained when an amount of light input to the corresponding reading pixel is zero.

* * * * *